(12) United States Patent
Zhang et al.

(10) Patent No.: US 12,523,308 B2
(45) Date of Patent: Jan. 13, 2026

(54) CERAMIC VALVE CORE ASSEMBLY AND A SELF-CLEANING CERAMIC VALVE CORE

(71) Applicant: Duanlong Wu, Xiamen (CN)

(72) Inventors: Songgen Zhang, Xiamen (CN); Yuanfa Su, Xiamen (CN); Jiaming Hong, Xiamen (CN)

(73) Assignee: Duanlong Wu, Xiamen (CN)

( * ) Notice: Subject to any disclaimer, the term of this patent is extended or adjusted under 35 U.S.C. 154(b) by 82 days.

(21) Appl. No.: 18/607,537

(22) Filed: Mar. 17, 2024

(65) Prior Publication Data

US 2024/0218936 A1 Jul. 4, 2024

Related U.S. Application Data

(63) Continuation of application No. PCT/CN2021/119303, filed on Sep. 18, 2021.

(30) Foreign Application Priority Data

Sep. 17, 2021 (CN) .......................... 202122257529.X (51) Int. Cl.
| | | |
|---|---|---|
| *F16K 11/07* | (2006.01) | |
| *F16K 3/02* | (2006.01) | |
| *F16K 11/074* | (2006.01) | |
| *F16K 31/524* | (2006.01) | |
| *F16K 39/02* | (2006.01) | |

(52) U.S. Cl.
CPC .... *F16K 11/0743* (2013.01); *F16K 31/52483* (2013.01); *F16K 39/026* (2013.01)

(58) Field of Classification Search
CPC . F16K 11/0743; F16K 11/0787; F16K 3/0209
See application file for complete search history.

(56) References Cited

U.S. PATENT DOCUMENTS 6,227,246 B1 5/2001 Hall et al.

FOREIGN PATENT DOCUMENTS

| CN | 202032112 U | 5/2011 |
|---|---|---|
| CN | 203770727 U | 2/2014 |
| CN | 204692658 U | 4/2015 |
| CN | 209540105 U | 1/2019 |
| CN | 211852899 U | 3/2020 |
| WO | WO/2023/039875 | 9/2021 |

OTHER PUBLICATIONS

Original and Translation of WO 2017193577 A1; Tan Weiliang, Wu Yuzhi, Hu Lihong, Chen Wenxing; Nov. 16, 2017.*
International Search Report of PCT/CN2021/119303.

* cited by examiner

*Primary Examiner* — Paul J Gray (57) ABSTRACT

A ceramic valve core assembly including a movable valve plate which is rotatable and slidably attached on a fixed valve plate, the fixed valve plate has a first cold water inlet, a first hot water inlet, and a first water outlet. The movable valve plate has a first water inlet and a second water outlet in communication with the first water outlet. The first water inlet includes a filter mounting cavity and a water mixing cavity in communication with each another. By rotating the movable valve plate, the first cold water inlet, the first hot water inlet, or both the first cold water inlet and the first hot water inlet establish communication with the water mixing cavity. A lower edge of the second water outlet contacts an upper edge of the first water outlet. Thus, by moving the movable valve plate, a water passage is established.

10 Claims, 6 Drawing Sheets

CERAMIC VALVE CORE ASSEMBLY AND A SELF-CLEANING CERAMIC VALVE CORE

This application is a continuation of International Application No. PCT/CN2021/119303, filed on Sep. 18, 2021, which is based upon and claims priority to Chinese Patent Application No. 202122257529.X, filed on Sep. 17, 2021, which is incorporated by reference herein in its entirety.

TECHNICAL FIELD

Background

Faucets having functions of controlling hot and cold water are commonplace sanitary products in bathrooms, toilets and other spaces. In a known faucet which has two inlets and one outlet, a ceramic valve core is usually employed to control the on/off of a water flow and to adjust the water temperature. Another type of valve core structure which is known and commonly seen has a solenoid valve for controlling the on/off of the water flow. However, the overall piping of this type of structure is complex and prone to problems such as failure, water leakage and so on.

In order to further improve a user's experience, a filter is usually placed at the water inlet of an existing solenoid valve core. However, any impurities in the pipeline will be kept in the hot and cold water mixing cavity, and the impurities are hard to be removed and can not enter a solenoid valve membrane, thereby causing solenoid valve failure.

SUMMARY OF THE DISCLOSURE

The present disclosure aims to overcome the drawbacks of the existing technology and provides a ceramic valve core assembly and a self-cleaning ceramic valve core.

In order to achieve the above objectives, the present disclosure provides the following technical solutions.

A ceramic valve core assembly includes a fixed valve plate and a movable valve plate. The movable valve plate is rotatable and is slidably attached on the fixed valve plate. The fixed valve plate includes a first cold water inlet, a first hot water inlet, and a first water outlet. The movable valve plate includes a first water inlet and a second water outlet. The first water outlet communicates with the second water outlet to form a water outlet channel. The first water inlet includes a filter mounting cavity and a water mixing cavity in communication with each another and are arranged sequentially from top to bottom. By rotating the movable valve plate, the first cold water inlet, the first hot water inlet, or both the first cold water inlet and the first hot water inlet establish communication with the water mixing cavity. A lower edge of the second water outlet contacts an upper edge of the first water outlet. Thus, by moving the movable valve plate away from a water inlet side of the fixed valve plate, a water passage formed by the first cold water inlet, the first hot water inlet, the water mixing cavity and the first water outlet is established.

Further, the diameter of an upper part of the first water outlet increases from a lower side to an upper side, or the diameter of a lower part of the second water outlet decreases from an upper side to a lower side.

According to another aspect of the present disclosure, a self-cleaning ceramic valve core is provided, the self-cleaning ceramic valve core includes the valve core assembly as described above and further includes a sealing seat, a flexible blocking body, a solenoid valve, and a filter member. The sealing seat is transmittingly connected to the movable valve plate. A balancing cavity is provided between the sealing seat and the flexible blocking body. The balancing cavity is connected to a pressure relief channel. The solenoid valve controls the opening and closing of the pressure relief channel. The flexible blocking body is configured to connect or disconnect a water flow passage from the first water inlet to the second water outlet, and the filter member is mounted in the filter mounting cavity.

Further, the aforementioned self-cleaning ceramic valve core also includes a rotatable sleeve corresponded and engaged to an upper part of the sealing seat, a handle hinged in the rotatable sleeve and transmittingly connected to an upper part of the sealing seat, and a blocking body support corresponded and engaged under the sealing seat. A lower end of the blocking body support is corresponded to and engaged with the movable valve plate, and the flexible blocking body is mounted in a mounting hole set in the middle of the blocking body support, and a water inlet cavity is formed between the flexible blocking body and an inner bottom wall of the blocking body support. The mounting hole communicates with the second water outlet. An inner bottom wall of the water inlet cavity is provided with a second water inlet, and the second water inlet communicates with the first water inlet.

Further, a sidewall of the balancing cavity is provided with a first pressure relief port, a sidewall of the blocking body support opposite to the first pressure relief port is provided with a second pressure relief port, and the movable valve plate is provided with a third pressure relief port. The fixed valve plate is provided with a ventilation groove at a position opposite to the third pressure relief port. A fourth pressure relief port is provided at one end of the ventilation groove. The first pressure relief port, the second pressure relief port, the third pressure relief port and the fourth pressure relief port form a first pressure relief passage.

Further, the aforementioned self-cleaning ceramic valve core also includes a valve core seat and a valve core sleeve. The fixed valve plate is engaged in the valve core seat. The valve core sleeve corresponds to and is engaged with the valve core seat. The valve core seat is provided with through holes correspondingly communicating with the first cold water inlet, the first hot water inlet, and the first water outlet. The valve core seat is provided with a second pressure relief passage. The solenoid valve includes a valve sleeve and a valve stem connected in the valve sleeve. The valve stem is configured to establish or cut off a connection between the first water outlet and the second pressure relief passage. The first pressure relief passage and the second pressure relief passage cooperatively form a pressure relief channel.

Further, the second pressure relief passage includes a pressure relief cavity located between a bottom surface of the valve core seat and the solenoid valve. A sidewall of the pressure relief cavity is provided with a fifth pressure relief port, and the fifth pressure relief port communicates with the fourth pressure relief port. An upper wall of the pressure relief cavity is provided with a sixth pressure relief port. The sixth pressure relief port is connected to the first water outlet through a pressure relief groove. The valve stem is located below the sixth pressure relief port for opening or blocking off the sixth pressure relief port.

Further, the rotatable sleeve, sealing seat, blocking body support and movable valve plate are rotatable relative to the valve core sleeve. The sealing seat, blocking body support and movable valve plate are laterally movable relative to the fixed valve plate in the valve core sleeve.

Further, a water-preventing pad is provided between the flexible blocking body and the blocking body support. The water-preventing pad has an outwardly extending extension portion, and the extension portion is engaged with the sealing seat.

Further, the flexible blocking body is a diaphragm, and a spring is provided in the balancing cavity. One end of the spring is biased against the sealing seat, and the other end of the spring is biased against the diaphragm.

Advantages of this Present Disclosure

The present disclosure employs specially designed movable valve plate and fixed valve plate to automatically remove impurities accumulated at the bottom of the filter screen by operating the handle, thereby reducing the failure rate of the solenoid valve.

When the pressure relief passage is turned on, the fluid in the balancing cavity is discharged which forms a pressure difference between the water inlet cavity and the balancing cavity. This causes the water flow pushes up the diaphragm to open the water outlet passage. A solenoid valve core incorporated with the structure proposed by the present disclosure thus has a simple and reliable structure which is suitable for wide spread.

The realization of the purpose, functions, features and advantages of the present disclosure will be further described in combination with the embodiments with reference to the accompanying drawings.

DETAILED DESCRIPTION OF THE EMBODIMENTS

In order to make the objectives, technical solutions, and advantages of the embodiments of the present disclosure clearer, the technical solutions of the embodiments of the present disclosure will be described clearly and completely below with reference to the drawings of the embodiments of the present disclosure. Obviously, the described embodiments are parts of, but not all of, the embodiments of the present disclosure. Based on the embodiments of the present disclosure, all other embodiments derived by those of ordinary skills in the art without creative effort fall within the scope of protection of the present disclosure. Accordingly, the following detailed description of the embodiments of the present disclosure shown in the drawings is not intended to limit the scope of protection of the present disclosure, but merely to represent selected embodiments of the present disclosure. Based on the embodiments of the present disclosure, all other embodiments derived by those of ordinary skills in the art without creative effort fall within the scope of protection of the present disclosure.

In the description of the present disclosure, it should be noted that the terms of "up/upper", "down/lower", "inside/inner", "outside/outer", "front end", "rear end", "two ends", "one end", "another end", "one side", "another side" for indicating the location or orientation are based on the location or orientation shown in the drawings for the sake of simplifying the description of the present disclosure, rather than indicate or imply that the indicated device or component must have specific location or orientation, or be constructed and operated by specific orientation. These terms should not be understood as limits to the present disclosure. In addition, the terms "first", "second" are used only for descriptive purposes and cannot be understood as indicating or implying relative importance.

In the description of the present disclosure, it should be noted that, unless otherwise clearly defined or restricted, the terms "provide/arrange", "connect", etc. should be understood in a broad sense. For example, "connect" may be interpreted as a fixed connection, a detachable connection, or an integrated connection, it may also be interpreted as a mechanical connection or an electrical connection, or a direct connection or an indirect connection through an intermediate medium. Optionally, it may refer to the communication of two components. For those of ordinary skill in the art, the meaning of the above-mentioned terms in the present disclosure should be understood under specific circumstances.

The content of the present disclosure will be described in detail below in terms of the embodiments.

Referring to FIGS. 1-10, according to an embodiment of the present disclosure, a self-cleaning ceramic valve core is provided which includes a fixed valve plate 1, a movable valve plate 2, a sealing seat 3, a flexible blocking body 4, a solenoid valve 5, a filter member 6, a rotatable sleeve 7, a handle 8, a blocking body support 9, a valve core seat 10, and a valve core sleeve 11. The rotatable sleeve 7 corresponds and is engaged to an upper part of the sealing seat 3, the handle 8 is hinged in the rotatable sleeve 7 and is transmittingly connected to the upper part of the sealing seat 3. The blocking body support 9 corresponds to and is engaged under the sealing seat 3. The movable valve plate 2 is rotatable and is slidably attached on the fixed valve plate 1. The fixed valve plate 1 has a first cold water inlet 101, a first hot water inlet 102 and a first water outlet 103. The movable valve plate 2 has a first water inlet 21 and a second water outlet 22. The first water outlet 103 and the second water outlet 22 communicate with each other to form a water outlet channel. The first water inlet 21 includes a filter mounting cavity 211 and a water mixing cavity 212. The filter mounting cavity 211 and the water mixing cavity 212 are arranged sequentially from top to bottom and communicate with each other. By rotating the movable valve plate 2, the first cold water inlet 101 and the first hot water inlet 102 respectively communicates with the water mixing cavity 212 or the first cold water inlet 101 and the first hot water inlet 102 simultaneously communicate with the water mixing cavity 212. The lower edge of the second water outlet 22 contacts the upper edge of the first water outlet 103. By moving the movable valve plate 2 away from a water inlet side of the fixed valve plate 1, a passage formed by the first cold water inlet 101, the first hot water inlet 102, the mixing cavity 212 and the first water outlet 103 is established. The diameter of an upper part of the first water outlet 103 increases from a lower side to an upper side, or the diameter of a lower part of the second water outlet 22 decreases from an upper side to a lower side. The sealing seat 3 is transmittingly connected to the movable valve plate 2. A balancing cavity 31 is provided between the sealing seat 3 and the flexible blocking body 4. The balancing cavity 31 is connected to a pressure relief channel. The solenoid valve 5 controls the opening and closing of the pressure relief channel. The flexible blocking body 4 is configured to connect or disconnect the water flow passage from the first water inlet 21 to the second water outlet 22. The filter member 6 is mounted in the filter mounting cavity 211. A lower end of the blocking body support 9 corresponds to and is engaged with the movable valve plate 2, and the flexible blocking body 4 is mounted in a mounting hole 91 set in the middle of the blocking body support 9 to form a water inlet cavity 92 between the flexible blocking body 4 and an inner bottom wall of the blocking body support 9. The mounting hole 91 communicates with the second water outlet 22. An inner bottom wall of the water inlet cavity 92 is provided with a second water inlet 93 and the second water inlet 93 communicates with the first water inlet 21. A sidewall of the balancing cavity 31 is provided with a first pressure relief port 311, a sidewall of the blocking body support 9 opposite to the first pressure relief port 311 is provided with a second pressure relief port 312, and the movable valve plate 2 is provided with a third pressure relief port 23. The fixed valve plate 1 is provided with a ventilation groove 14 at a position opposite to the third pressure relief port 23. A fourth pressure relief port 15 is provided at one end of the ventilation groove 14. The first pressure relief port 311, the second pressure relief port 312, the third pressure relief port 23, and the fourth pressure relief port 15 form a first pressure relief passage.

The fixed valve plate 1 is engaged in the valve core seat 10, the valve core sleeve 11 corresponds to and is engaged with the valve core seat 10, and the valve core seat 10 is provided with through holes correspondingly communicate with the first cold water inlet 101, the first hot water inlet 102 and the first water outlet 103. The valve core seat 10 is also provided with a second pressure relief passage. The solenoid valve 5 includes a valve sleeve 51 and a valve stem 52 arranged inside the valve sleeve 51. The valve stem 52 is configured to establish or cut off a connection between the first water outlet 103 and the second pressure relief passage. The first pressure relief passage and the second pressure relief passage cooperatively form a pressure relief channel. The second pressure relief passage includes a pressure relief cavity 104 located between the bottom surface of the valve core seat 10 and the solenoid valve 5. A sidewall of the pressure relief cavity 104 is provided with a fifth pressure relief port 1041. The fifth pressure relief port 1041 communicates with the fourth pressure relief port 15. A top wall of the pressure relief cavity 104 is provided with a sixth pressure relief port 1042. The sixth pressure relief port 1042 communicates with the first water outlet 103 through a pressure relief groove 1043. The valve stem 52 is located under the sixth pressure relief port 1042 and is configured to open or block off the sixth pressure relief port 1042. The rotatable sleeve 7, sealing seat 3, blocking body support 9, and movable valve plate 2 are rotatable relative to the valve core sleeve 11. The sealing seat 3, blocking body support 9, and movable valve plate 2 are laterally movable in the valve core relative to the fixed valve plate 1. A water-preventing pad 41 may also be provided between the flexible blocking body 4 and the blocking body support 9. The water-preventing pad 41 has an outwardly extending extension part 411, and the extension part 411 is engaged with the sealing seat 3. The flexible blocking body 4 has an assembling portion 41 extending downwardly from the middle, and the water-preventing pad 41 is correspondingly provided with a through hole in the middle. The assembling portion 41 passes through the through hole and is plug-fitted with the assembling hole 91. The flexible blocking body 4 may be a diaphragm, and a spring 311 is provided in the balancing cavity 31. One end of the spring 311 is biased against the sealing seat 3, and the other end of the spring 311 is biased against the diaphragm 4.

Figure 1:
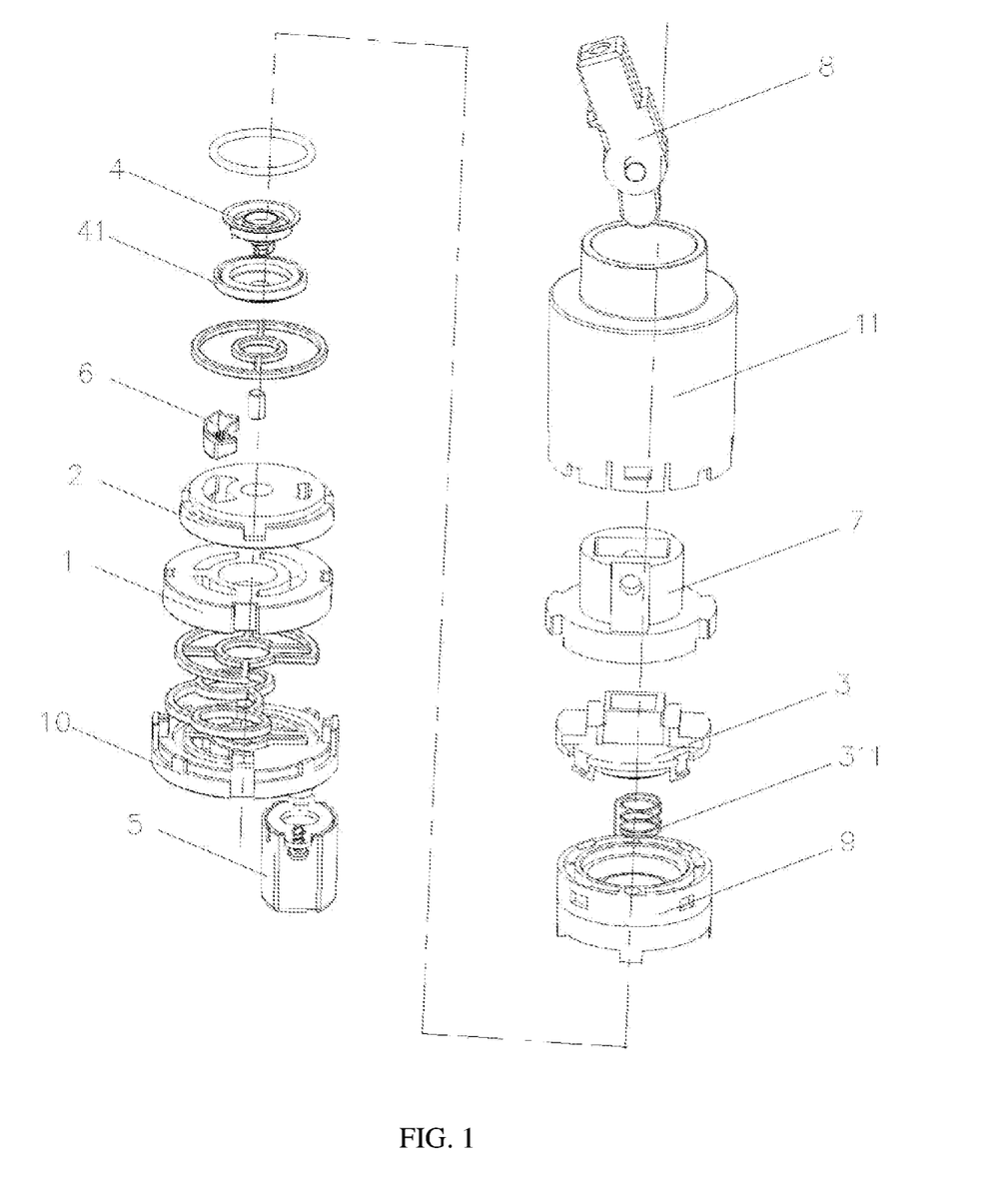
FIG. 1 is an exploded view of a self-cleaning ceramic valve core according to an embodiment of the present disclosure.
Figure 2:
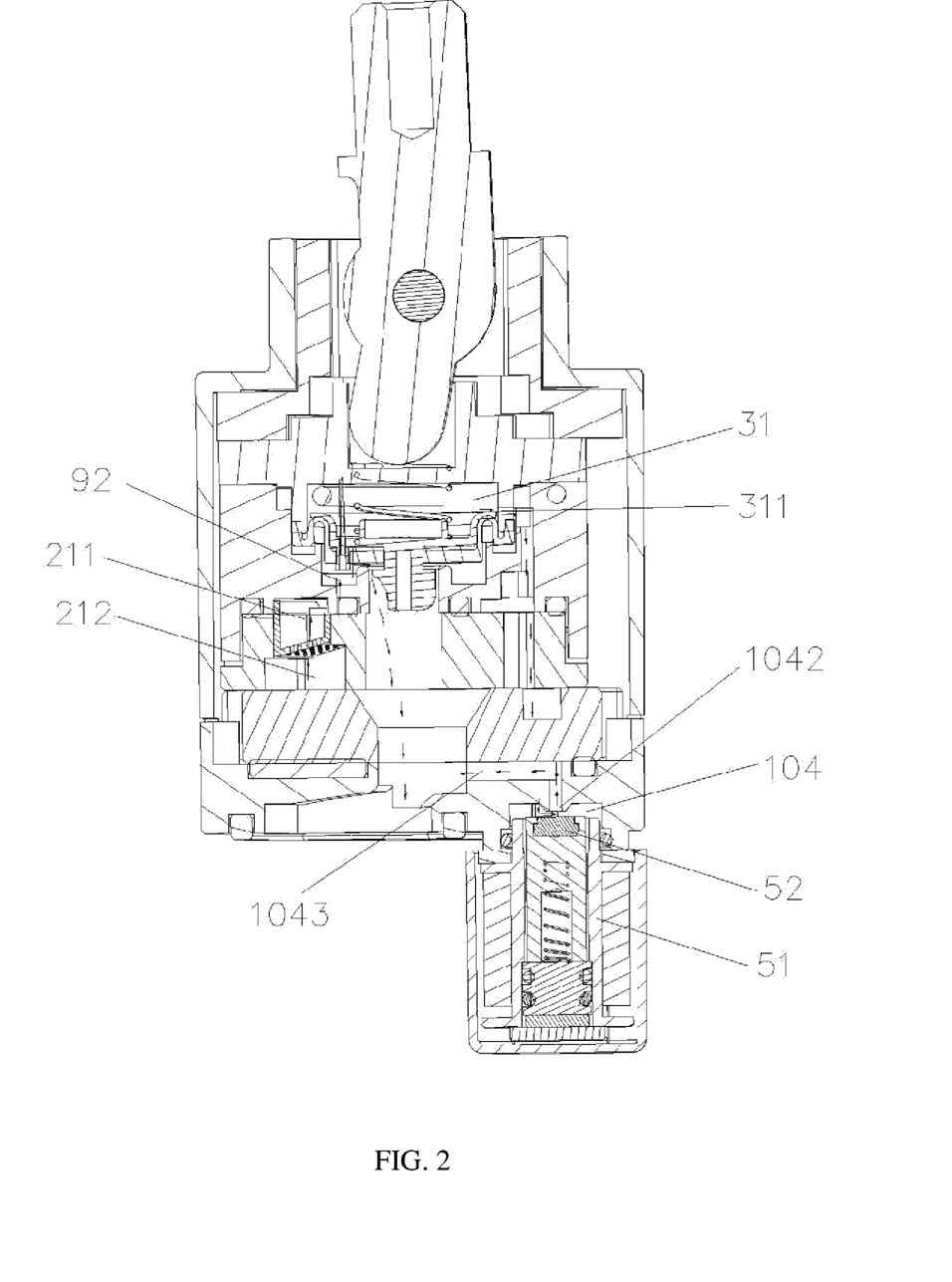
FIG. 2 is a cross-sectional view of a self-cleaning ceramic valve core under a first state according to an embodiment of the present disclosure.
Figure 3:
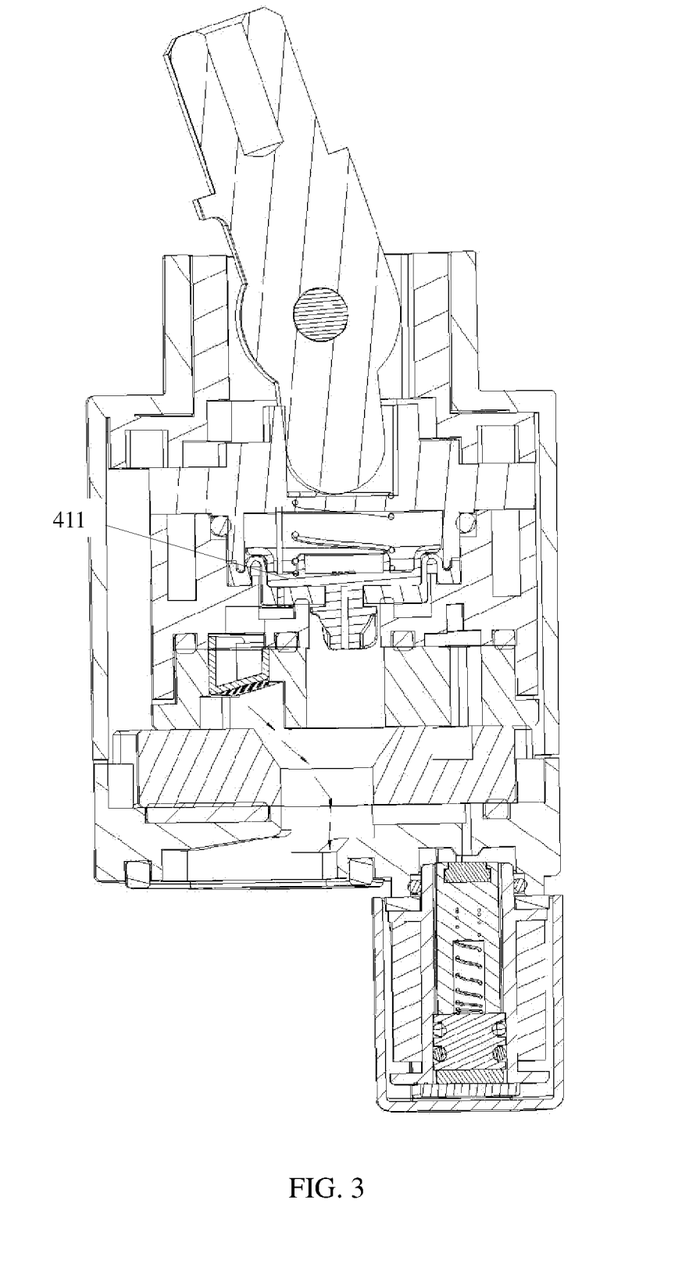
FIG. 3 is a cross-sectional view of a self-cleaning ceramic valve core under a second state according to an embodiment of the present disclosure.
Figure 4:
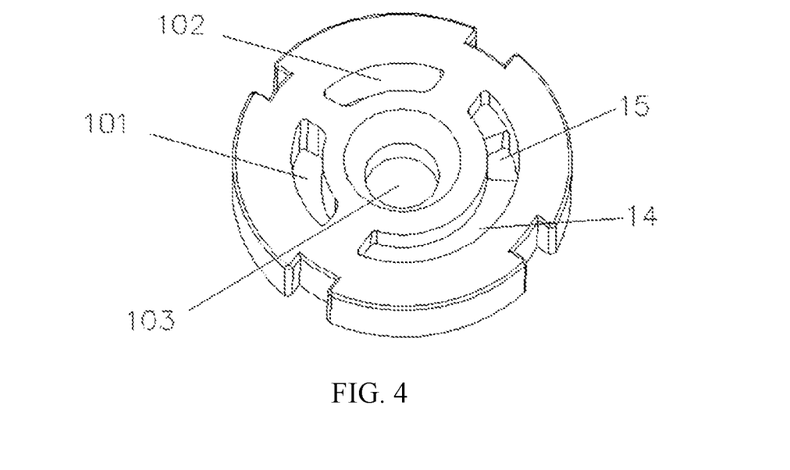
FIG. 4 is a structural schematic diagram of a fixed valve plate of a self-cleaning ceramic valve core according to an embodiment of the present disclosure.
Figure 5:
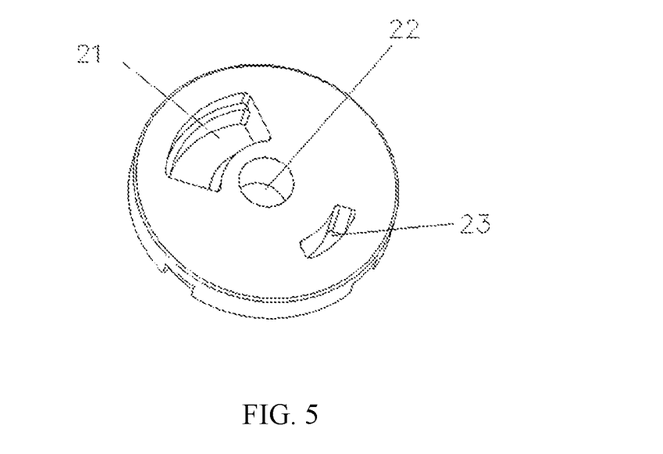
FIG. 5 is a structural schematic diagram of a movable valve plate of a self-cleaning ceramic valve core according to an embodiment of the present disclosure.
Figure 6:
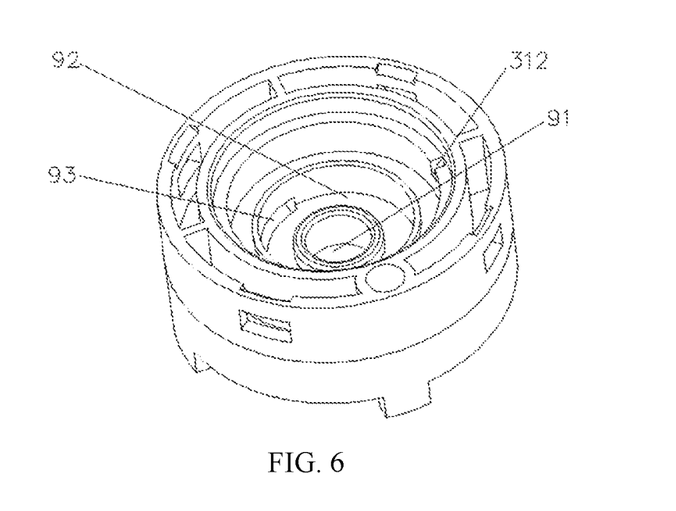
FIG. 6 is a structural schematic diagram of a blocking body support of a self-cleaning ceramic valve core according to an embodiment of the present disclosure.
Figure 7:
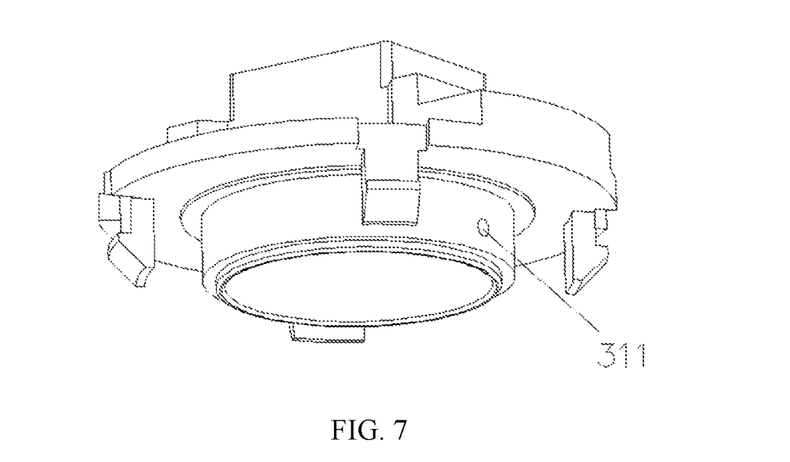
FIG. 7 is a structural schematic diagram of a sealing seat of a self-cleaning ceramic valve core according to an embodiment of the present disclosure.
Figure 8:
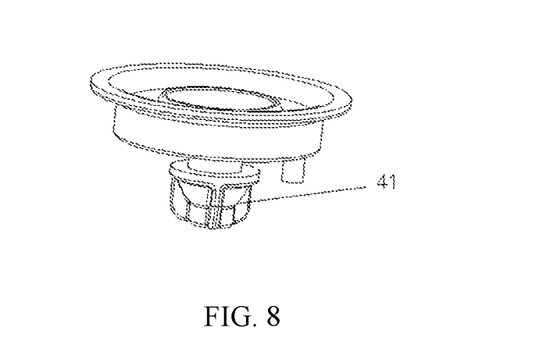
FIG. 8 is a structural schematic diagram of a flexible blocking body of a self-cleaning ceramic valve core according to an embodiment of the present disclosure.
Figure 9:
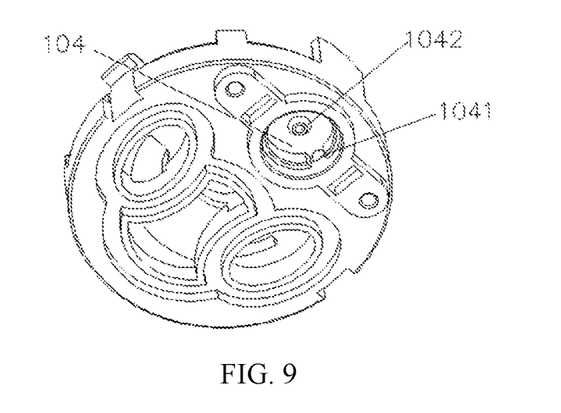
FIG. 9 is a structural schematic diagram showing the bottom surface of a valve core seat of a self-cleaning ceramic valve core according to an embodiment of the present disclosure.
Figure 10:
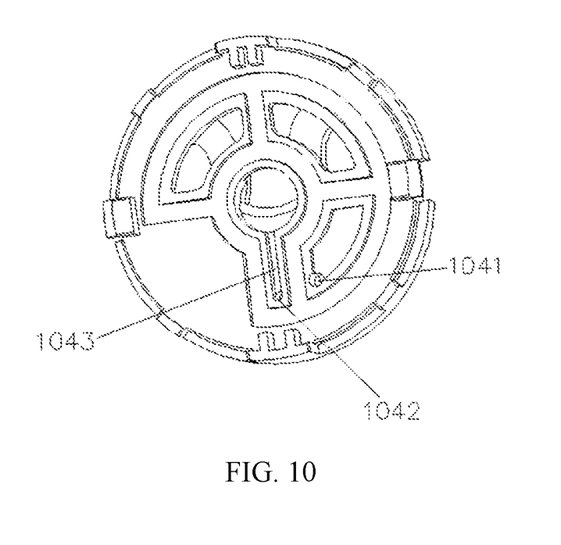
FIG. 10 is a structural schematic diagram showing the upper surface of the valve core seat of the self-cleaning ceramic valve core according to an embodiment of the present disclosure.

Here's how this application works:

As shown in FIG. 2, when the handle is closed, the valve stem 52 of the solenoid valve 5 moves downward to open the sixth pressure relief port 1042. Meanwhile, the pressure relief passage communicates with the first water outlet 103, and the fluid in the balancing cavity 31 is discharged through the first pressure relief port 311, the second pressure relief port 312, the third pressure relief port 23, the fourth pressure relief port 15, the fifth pressure relief port 1041, the pressure relief cavity 104, the sixth pressure relief port 1042, the pressure relief groove 1043, and the first water outlet 103. At the same time, the water flow enters the water mixing cavity 212 from the first cold water inlet 101 and/or the first hot water inlet 102. The mixed water is filtered by the filter member 6 and then enters the filter mounting cavity 211, and then the water flow enters the water inlet cavity 92 from the second water inlet 93. Since the fluid in the balancing cavity 31 is discharged, a pressure difference is formed between the water inlet cavity 92 and the balancing cavity 31. The water flow pushes the flexible blocking body 4 upward and passes through the assembling hole 91, the second water outlet 22 and the first water outlet 103 to flow out. The impurities carried in the water source are kept in the water mixing cavity 212 by the filter member 6. As shown in FIG. 3, when the handle 8 is operated to the opposite direction, the sealing seat 3, the blocking body support 9, and the movable valve plate 2 all move to the right. At this time, the lower edge of the second water outlet 22 and the upper edge of the first water outlet 103 are staggered, and the water mixing cavity 212 is directly connected to the first water outlet 103. Since this water passage has small resistance, the water flow directly flushes the water mixing cavity 212 and carries away the impurities accumulated therein and discharges the impurities from the first water outlet 103. When the valve stem 52 of the solenoid valve 5 moves upward to block off the sixth pressure relief port 1042, the passage between the pressure relief passage and the first water outlet 103 is cut off, and the pressure in the balancing cavity 31 is greater than the water pressure in the water inlet cavity 92, so as to cut off the water discharge passage. This structure uses the specially designed movable valve plate 2 and the fixed valve plate 1 to automatically remove the impurities accumulated at the bottom of the filter member 6 by operating the handle 8, thereby reducing the failure rate of the solenoid valve 5.

The implementations in the above embodiments can be further combined or replaced, and these embodiments only describe the preferred embodiments of the present disclosure, and are not intended to limit the concept and scope of the present disclosure. Various changes and improvements made to the technical solution of the present disclosure by those skilled in the art without departing from the design concept of the present disclosure should all be considered as falling within the scope of protection of the present disclosure.

The invention claimed is:

1. A self-cleaning ceramic valve core comprising a ceramic valve core assembly, wherein the ceramic valve core assembly comprises a fixed valve plate and a movable valve plate, the movable valve plate is rotatable and is slidably attached on the fixed valve plate, the fixed valve plate comprises a first cold water inlet, a first hot water inlet and a first water outlet, the movable valve plate comprises a first water inlet and a second water outlet, and wherein the first water outlet communicates with the second water outlet to form a water outlet channel, the first water inlet comprises a water mixing cavity and a filter mounting cavity having a filter member mounted therein for filtering impurities; the filter mounting cavity and the water mixing cavity are in communication with each another and are arranged sequentially from top to bottom, so as to allow filtered impurities to accumulate in the water mixing cavity; wherein by rotating the movable valve plate, the first cold water inlet, the first hot water inlet, or both the first cold water inlet and the first hot water establish communication with the water mixing cavity; a lower edge of the second water outlet contacts an upper edge of the first water outlet, thus by moving the movable valve plate away from a water inlet side of the fixed valve plate, a water passage formed by the first cold water inlet, the first hot water inlet, the water mixing cavity and the first water outlet is established;

wherein the movable valve plate is laterally moveable relative to the fixed valve plate for directly connecting the water mixing cavity to the first water outlet, and thereby allowing the impurities accumulated in the water mixing cavity to be flushed through the first water outlet.

2. The self-cleaning ceramic valve core according to claim 1, characterized in that the diameter of an upper part of the first water outlet increases from a lower side to an upper side, or the diameter of a lower part of the second water outlet decreases from an upper side to a lower side.

3. The self-cleaning ceramic valve core according to claim 1 further comprising a sealing seat, a flexible blocking body, a solenoid valve, wherein the sealing seat is transmittingly connected to the movable valve plate, a balancing cavity is provided between the sealing seat and the flexible blocking body, the balancing cavity is connected to a pressure relief channel, the solenoid valve controls the opening and closing of the pressure relief channel, the flexible blocking body is configured to connect or disconnect a water flow passage from the first water inlet to the second water outlet.

4. The self-cleaning ceramic valve core according to claim 3, characterized in that: the self-cleaning ceramic valve core further comprises a rotatable sleeve corresponded and engaged to an upper part of the sealing seat, a handle hinged in the rotatable sleeve and transmittingly connected to an upper part of the sealing seat, and a blocking body support corresponded to and engaged under the sealing seat, wherein a lower end of the blocking body support is corresponded to and engaged with the movable valve plate, and the flexible blocking body is mounted in a mounting hole set in the middle of the blocking body support, and a water inlet cavity is formed between the flexible blocking body and an inner bottom wall of the blocking body support, the mounting hole communicates with the second water outlet, an inner bottom wall of the water inlet cavity is provided with a second water inlet, and the second water inlet communicates with the first water inlet.

5. The self-cleaning ceramic valve core according to claim 4, characterized in that: a sidewall of the balancing cavity is provided with a first pressure relief port, a sidewall of the blocking body support opposite to the first pressure relief port is provided with a second pressure relief port, and the movable valve plate is provided with a third pressure relief port, the fixed valve plate is provided with a ventilation groove at a position opposite to the third pressure relief port, a fourth pressure relief port is provided at one end of the ventilation groove; wherein the first pressure relief port, the second pressure relief port, the third pressure relief port and the fourth pressure relief port form a first pressure relief passage.

6. The self-cleaning ceramic valve core according to claim 5, characterized in that: the self-cleaning ceramic valve core further comprises a valve core seat and a valve core sleeve, wherein the fixed valve plate is engaged in the valve core seat, the valve core sleeve corresponds to and is engaged with the valve core seat, the valve core seat is provided with through holes correspondingly communicating with the first cold water inlet, the first hot water inlet, and the first water outlet, the valve core seat is provided with a second pressure relief passage, the solenoid valve includes a valve sleeve and a valve stem connected in the valve sleeve, the valve stem is configured to establish or cut off a connection between the first water outlet and the second pressure relief passage, the first pressure relief passage and the second pressure relief passage cooperatively form a pressure relief channel.

7. The self-cleaning ceramic valve core according to claim 6, characterized in that: the second pressure relief passage comprises a pressure relief cavity located between a bottom surface of the valve core seat and the solenoid valve, wherein a sidewall of the pressure relief cavity is provided with a fifth pressure relief port, and the fifth pressure relief port communicates with the fourth pressure relief port, an upper wall of the pressure relief cavity is provided with a sixth pressure relief port, the sixth pressure relief port is connected to the first water outlet through a pressure relief groove, the valve stem is located below the sixth pressure relief port for opening or blocking off the sixth pressure relief port.

8. The self-cleaning ceramic valve core according to claim 7, characterized in that: the rotatable sleeve, sealing seat, blocking body support and movable valve plate are rotatable relative to the valve core sleeve; the sealing seat, blocking body support and movable valve plate are laterally movable relative to the fixed valve plate in the valve core sleeve.

9. The self-cleaning ceramic valve core according to claim 4, characterized in that: a water-preventing pad is provided between the flexible blocking body and the blocking body support, wherein the water-preventing pad has an outwardly extending extension portion, and the extension portion is engaged with the sealing seat.

10. The self-cleaning ceramic valve core according to claim 3, characterized in that: the flexible blocking body is a diaphragm, and a spring is provided in the balancing cavity having one end biased against the sealing seat, and the other end biased against the diaphragm.

\* \* \* \* \*